United States Patent [19]

Voegeli

[11] 3,930,244

[45] Dec. 30, 1975

[54] BUBBLE DOMAIN LATTICE BUFFER ARRANGEMENT

[75] Inventor: Otto Voegeli, San Jose, Calif.

[73] Assignee: International Business Machines Corporation, Armond, N.Y.

[22] Filed: Aug. 5, 1974

[21] Appl. No.: 494,940

[52] U.S. Cl. .................... 340/174 TF; 340/174 SR

[51] Int. Cl.$^2$ .................... G11C 11/14; G11C 19/08

[58] Field of Search .................... 340/174 TF, 174 SR

[56] References Cited

UNITED STATES PATENTS

| | | | |
|---|---|---|---|
| 3,460,116 | 8/1969 | Bobeck et al. | 340/174 TF |
| 3,676,872 | 7/1972 | Lock | 340/174 TF |
| 3,753,814 | 8/1973 | Pulliam et al. | 340/174 TF |
| 3,811,120 | 5/1974 | Bobeck | 340/174 TF |
| 3,869,683 | 3/1975 | Sokoloski | 340/174 TF |

OTHER PUBLICATIONS

AIP Conference Proceedings No. 5, Part 1, Magnetism and Magnetic Materials–1971, Nov. 16–19, "Bubble Lattices" by De Jonge et al.; p–130–134.

*Primary Examiner*—Stanley M. Urynowicz, Jr.
*Attorney, Agent, or Firm*—Joseph E. Kieninger

[57] ABSTRACT

Bubble domains in an enclosed lattice are translated for data accessing and buffered by providing stripe domains on both ends of a bubble lattice parallel to the direction of the bubble domain propagation. The stripe domains elongate at one end and contract at the other end in the positioning of a column of information carrying bubble domains into a column accessing device. Current in conductors at each end of the lattice and/or in propagation conductors near the column accessing devices change the shape of the stripe arrays so that the interposed bubble lattice is propagated while maintaining lattice integrity. Any one or all of the rows of bubble domains in the lattice file can be translated to position information carrying bubble domains for column accessing.

23 Claims, 4 Drawing Figures

BUBBLE DOMAIN LATTICE BUFFER ARRANGEMENT

BACKGROUND OF THE INVENTION

This invention relates generally to information storage devices and more particularly to thin film magnetic domain devices.

FIELD OF THE INVENTION

A single wall or bubble domain for the present invention is defined as a magnetic domain bounded by a domain wall which closes on itself in the plane of a host magnetic medium and has a geometry independent of the boundaries of a sheet of the medium in the plane in which it is moved. The term bubble domain includes circular wall-shaped domains and elongated circular or stripe domains. The term as used herein also includes segment domains where a portion of the domain boundary is completed by a magnetic discontinuity such as a boundary of the sheet. Inasmuch as a bubble domain is self defined in a plane of movement, it is free to move in two dimensions and such a plane as is now well known. The movement of domains is normally performed by generating localized fields within the host magnetic medium of a polarity to attract domains.

Materials which are well known in the art for their ability to support bubble domains are rare earth orthoferrites and garnets. These materials have preferred directions of magnetization substantially normal to the plane of the sheet. A bubble domain, in a material of this type, is magnetized in one direction along its axis whereas the remainder of the sheet is magnetized in the opposite direction, the domain appearing as a dipole oriented normal to the plane of the sheet. Other magnetic materials may be used as bubble domain carriers so long as the magnetic material is anisotropic with the easy axis of magnetization normal to the plane of the sheet.

A bubble domain arrangement in somewhat of a lattice form can be established on a bubble medium by enclosing a plurality of bubble domains. Accessing means can be provided to enter and remove bubble domains into and out of the lattice. The bubble domains themselves store the necessary data information such as in the sense of magnetic rotation within the domain walls as shown in the IBM Technical Disclosure Bulletin, Magnetic Domain Wall Information Storage by G. R. Henry, Vol. 13, No. 10, March 1971, p. 3021. The interaction forces between domains stabilize their position within the lattice. The bubble domain lattice is therefore an efficient information storage device.

DESCRIPTION OF THE PRIOR ART

In the prior art bubble domain lattice arrangement, either the ends of the lattice were open to provide insertion and removal of bubble domains for utilization of the information stored by the bubble domains, or the lattice was completely confined around both ends and both sides with internal accessing means. U.S. Pat. application, Ser. No. 395,336, filed on Sept. 7, 1973, and assigned to the same assignee as the present invention discloses a useful bubble domain system in the form of an open-ended lattice. An enclosed lattice of information storing bubble domains together with a column accessing of bubble domain elements from the lattice is described in U.S. Pat. application, Ser. No.

429,601, filed on Jan. 2, 1974 and assigned to the assignee of the present invention.

The open-ended lattice required propagation means and insertion means to direct a plurality of rows of bubble domains a column at a time from a writing means into the lattice. Further propagation and retrieval means were then required to move bubble domains from the lattice into sensing means for detection of the information stored in the bubble domains.

It is therefore an object of the present invention to provide a bubble domain arrangement that is small in size and does not require elaborate propagation and control means.

The enclosed lattice of bubble domains provided a smaller structure for an information storage device. The insertion of bubble domains into the lattice was by column access devices which inserted a column of bubble domains into the lattice transverse to the propagation direction. The translation of the bubble domains bidirectionally into and out of the column accessing devices required the generation of domains at one end and the annihilation of domains at the other end. These domains were elongated bubble or stripe domains elongated transverse to the bubble domain translation into the column accessing device. The nucleation and annihilation were necessary to maintain the integrity of the lattice, that is, the lattice must at all times be completely full of bubble domains. The number of bubble domains in a stable lattice depends on the size of the lattice and the bubble domains, and this together with the interaction distance between the bubble domains maintains the lattice. The generation and annihilation of domains requires various control means and more complex apparatus and therefore is an inefficient means for maintaining lattice integrity.

It is another object of the present invention to provide a lattice of bubble domains which does not require the generation and annihilation of bubble domains to maintain lattice integrity.

SUMMARY OF THE INVENTION

The lattice arrangement of bubble domains according to the present invention includes a buffer section of stripe domains established from each end of the lattice and elongated in the direction of propagation of the bubble domains storing data information. The information storing bubble domains are bidirectionally propagated into and out of column accessing device which provides the formation and sensing of the bubble domains. The stripe domains are adjusted in length by an adjusting means such that selected stripe domains are elongated at one end to propagate the bubble domain and to fill the space emptied by the bubble domains, and contracted in stripe length at the other end to permit propagation toward its end. Consequently, a confined lattice of bubble domains can be constructed without domain generation or annihilation means at the ends of the bubble lattice to insure bubble domain lattice integrity.

The buffer section for maintaining the integrity of a transverse access propagation bubble domain lattice on a medium supporting bubble domains comprises a plurality of rows of stripe domains, one column on each end of the lattice and one row for each row of information storing bubble domains, together with means for adjusting the length of each stripe domain, either individually, in groups, or all at the same time. Domain interaction prevention means are included between the rows of domains propagated individually into and out of the column accessing means. Propagation means can be provided to assist in the bubble domain propagation. The propagation means can provide for both the propagation of the information carrying bubble domains and the conforming or adjusting means for changing the length of the stripe domains in the rows propagated by changing the interactive forces between domains.

The adjusting means can comprise a bias field generating means such as a current carrying conductor either in serpentine form to enclose and control the length of the stripe domains or a straight conductor placed parallel to the end of the lattice.

A bubble domain lattice arrangement according to the preferred embodiment comprises an enclosed plurality of domains including a buffer section of stripe domains on each end of the lattice. Column accessing means insert and remove a column of bubble domains into and out of the lattice. Propagating means provide bubble domain movement along its row into and out of the column accessing means transverse to the column accessing means. Means are included for adjusting or changing the elongation length of the stripe domains on both ends of the lattice. The adjusting means operate in conjunction with the propagating means, if included, such that the stripe domains elongate and contract according to the direction of propagation of the bubble domains. The column accessing means can include writing means to formulate bubble domains according to the information required to be stored by the individual bubble domain. Sensing means can also be provided in conjunction with the column accessing means to sense the stored data information in the bubble lattice.

The adjusting means for the stripe domains can comprise a separate conductor at each end of the lattice. The current for the conductors is adjusted accordingly to establish a magnetic field gradient such that the stripe domains are elongated at one end and contracted at the other end. The adjusting means according to the present invention, together with the propagation means, controls each row of bubble domains, both stripe and cylindrical, either individually, in groups or all at the same time.

The lattice arrangement according to the present invention therefore includes a buffer area that permits lateral bubble domain translation without requiring generation and annihilation of domains while insuring the integrity of the lattice. Since the combination of stripe and bubble domain arrays is in eqiulibrium, the ordered domain arrangement is maintained. The lattice configuration remains in a stable state.

It is therefore a primary object of the present invention to provide a stable bubble domain lattice arrangement.

It is another object of the present invention to provide an enhanced lattice arrangement comprising a plurality of rows and columns of bubble domains.

It is yet another object to provide buffer areas at each end of a bubble lattice whose size comply to bubble lattice translation.

Still a further object of the present invention is to provide a lattice arrangement for propagating information storing bubble domains including stripe domains whose lengths comply to bubble lattice translation.

A further object is to provide a bubble domain lattice arrangement which uses stripe domains elongated in the direction of domain translation as a buffer zone.

Yet a further object is to provide a bubble domain lattice arrangement that does not require generation and annihilation of bubble domains during bubble domain translation.

Still another object is to provide an information storage device using an improved bubble lattice arrangement with column accessing.

These and other objects of the present invention will become apparent to those skilled in the art as the description of the preferred embodiment proceeds.

BRIEF DESCRIPTION OF THE DRAWING

Further features and a more specific description of an illustrated embodiment of the invention are presented hereinafter with reference to the accompanying drawing, wherein.

DESCRIPTION OF THE PREFERRED EMBODIMENTS

Figure 1:
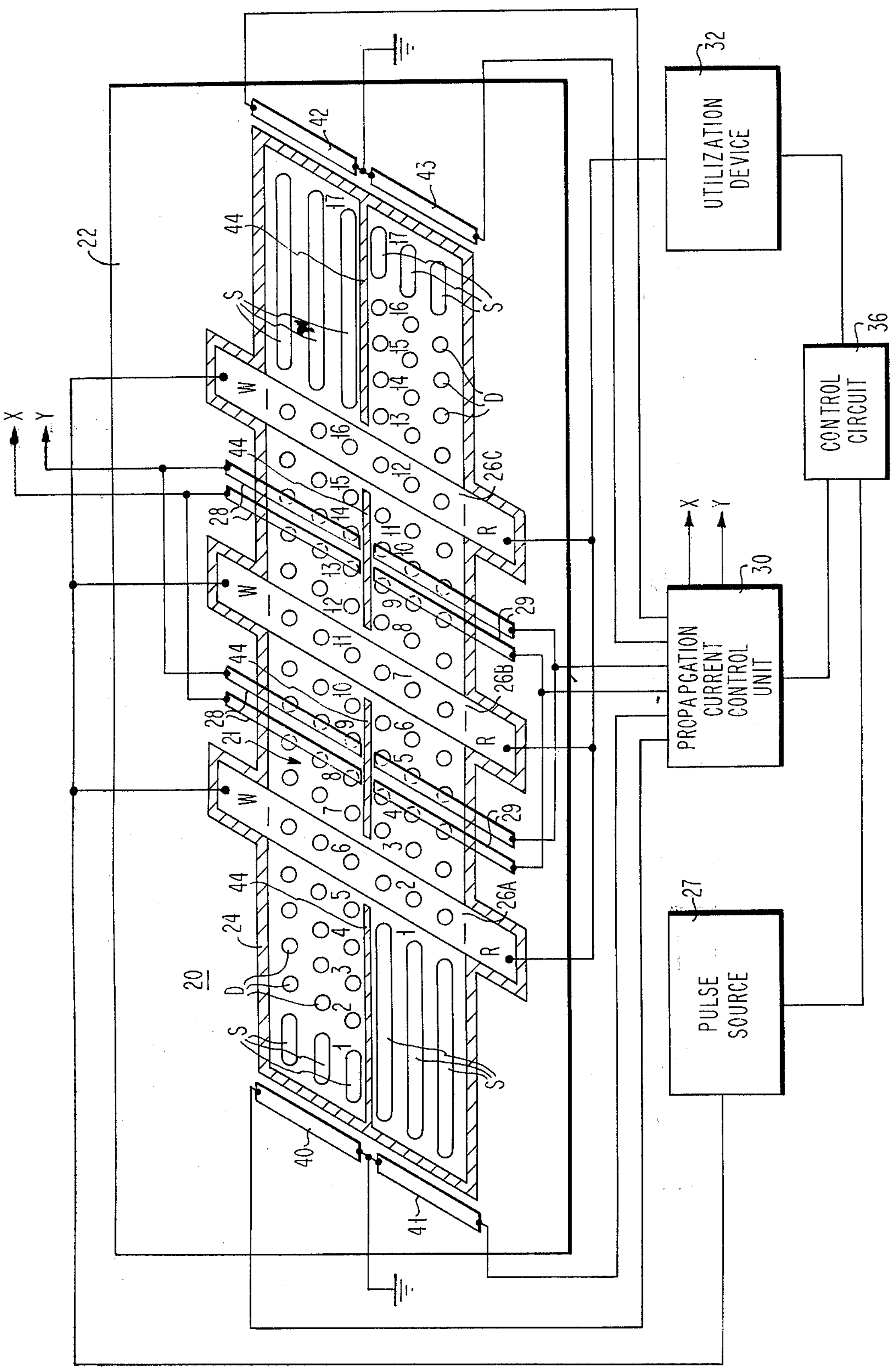
FIG. 1 shows a bubble domain lattice arrangement embodying the stripe domain buffer sections at each end.

The adaption of the apparatus according to the present invention for inducing translations of bubble domains in a preferred embodiment of an information store is shown in FIG. 1. FIG. 1 shows a detailed diagram of a bubble domain arrangement 20 formed on a suitable medium 22 for supporting bubble domains. Medium 22 can comprise any of the well known materials permitting bubble domains propagation including rare-earth orthoferrites and garnets.

The bubble domain arrangement 20 in FIG. 1 includes a lattice 21 comprising six rows of domains with each row having seventeen domains, 15 circular information storing bubble domains D hereinafter called bubble domains and two elongated bubble domains S hereinafter called stripe domains. The domains are contained within an enclosure means, guide rail 24, which surrounds the entire lattice 21. Guide rail 24 prevents the domains from escaping the lattice 21 and along with the interactive forces between domains provides the lattice integrity.

Three column accessing devices 26 A–C are shown, each comprising a write means W, such as a nucleating and encoding device, and a sensing or reading means R, such as a magnetoresistive sensor. An example of a column accessing device usable with the preferred embodiment of the present invention, as shown in FIG. 1, is given in a copending U.S. Pat. application Ser. No. 429,601 filed on Jan. 1, 1974, and assigned to the assignee of the present invention. Reference is herein made to U.S. Pat. application Ser. No. 429,601 for complete description for inclusion in the present application.

For the purposes of this description, column accessing devices 26 A–C insert and remove bubble domains D from the lattice 21 in a direction substantially transverse to the direction of domain propagation defined by the lattice. The bubble domains D are propagated in a horizontal direction in the plane of FIG. 1 into the column accessing devices 26 A–C by propagation means such as propagation conductors 28 and 29 supported by the means elongating and contracting the stripe domains S, all under control of a propagation current control unit 30. Six bubble domains of any one column located in a column accessing device can be moved transverse to the propagation direction by separate bubble domain movement means either propagation conductors or a bubble pump shift register (neither shown), as described in the aforementioned U.S. Pat. application Ser. No. 429,601. After detection of the removed bubble domains and transmittal of the information sensed to a utilization device 32, new bubble domains having the same or different information state can be inserted into the same column of the bubble domains by the write means W under control of a pulse source 27, or the same bubble domains can be returned to the lattice by reversing the movement direction of the bubble domains in any column accessing device. Any one of the column accessing devices 26 A–C can be actuated to sense one column of bubble domains or several devices 26 A–C can be actuated at one time to sense several columns of bubble domains.

The control of the propagation conductors 28 and 29 is accomplished in the well-known manner by the propagation current control unit 30. The control of the sequences of operation for the pulse source 27, the propagation current control unit 30, and the utilization device 32 is under control of a control circuit means 36. The control circuit 36 controls the operation to form the bubble domain according to the data required, to propagate the correct column of bubble domains into the closest column accessing device, and then out of the column accessing device 26 A–C for sensing and utilization when retrieval is required. The various means and circuits so far described for FIG. 1 may be any such element capable of operating in accordance with this invention.

Still referring to FIG. 1, the domain arrangement 20 is characterized by the formation of the stripe domains S at each end of the lattice 21 as a buffer zone section. The stripe domains S act as a buffer section by elongating and contracting in accordance with changing magnetic field patterns developed by buffer conductors 40–43 placed adjacent to the ends of the lattice 21 outside of the guide rail 24. As will be discussed later for FIGS. 2–4, the buffer conductors generate a field gradient affecting the size of the stripe domains S according to the electrical current patterns applied to each buffer conductor by the propagation current control unit 30.

As shown in FIG. 1, the buffer conductors 40–43 each affect three rows of domains within the lattice. It should be obvious that the buffer conductors each may be individual conductors controlling the size of the stripe domains S for each row of bubble domains, or can comprise any combination as desired by the particular application. For instance in FIG. 1, the first three rows are controlled by buffer conductors 40 and 42 formed on each end of the top portion of the lattice 21. Buffer conductors 41 and 43 on each end of the lower portion of the lattice 21 control the last three rows of bubble domains. The propagation current control unit 30 adjusts the current such that the buffer conductor 40 contracts the stripe domain at the left-top portion of FIG. 1 while the buffer conductor 42 elongates the stripe domains at the top-right portion of FIG. 1 when a translation of the bubble domain D to the left is required. The current in the propagation conductors 28 are sequenced, as required, to propagate the bubble domains.

The reverse situation is shown for the lower three rows such that the propagation current control unit 30 actuates the buffer conductor 41 such that the stripe domains elongate on the lower left portion of the lattice and actuates the buffer conductor 43 such that the stripe domains contract on the lower right hand portion by appropriately controlling the current in each translation conductor. Likewise the current in propagation conductors 29 is sequenced to propagate the bubble domains. Suitable bubble domain interaction prevention means, interaction line 44 such as a sputter etched groove, is provided between each group of three rows of bubble domains to prevent the change of interaction between adjacent stripe and circular domains during individual propagation from affecting the orderly control of the lattice.

The enclosure means of the lattice 20 of FIG. 1 such as guide rails 24 and the interaction line 44 can comprise any of the well known means for controlling the positioning of bubble domains such as by providing a high energy boundary for the bubble domains. Structures to provide high energy boundaries can be fabricated from current carrying conductors and magnetic materials. Also, changes in the magnetic properties of the bubble domain material can be used. Such changes include thickness changes such as a sputter etched groove and changes brought about by ion implantation, diffusion, etc. The sputter etched groove used and discussed herein for the guide rails 24 and the interaction line 44 of the preferred embodiment should not be taken as limiting this invention.

In FIG. 1 the bubble domains of column number 6 of the first three rows is shown positioned into the column accessing device 26A while the bubble domains of column number 2 of the last three rows are positioned in the same column accessing device 26A. Thus, different rows and columns of bubble domains can be intermixed and then sensed by actuating the column accessing device. This feature would be particularly useful in the modification of instruction words stored in an information storage device wherein the high order bits need to be modified at will to control the entry of a computer program into different sections of the memory store.

There are several types of translation or buffer conductors that can be used in accordance with the present invention. Two types are shown in FIGS. 2 and 3.

Figure 2:
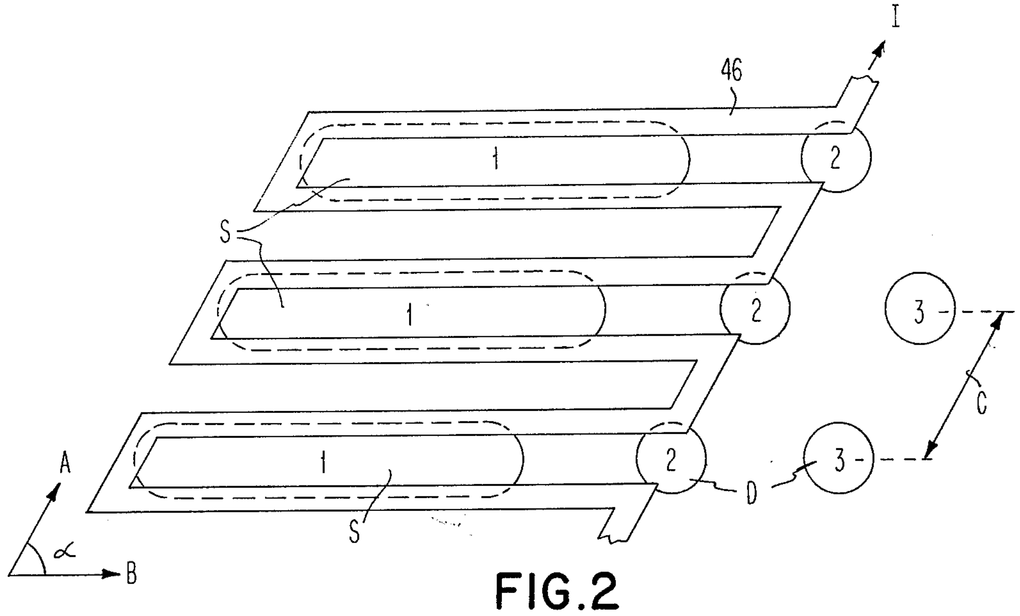
FIG. 2 illustrates one embodiment of a stripe domain length adjusting means usable in the arrangement shown in FIG. 1.
Figure 3:
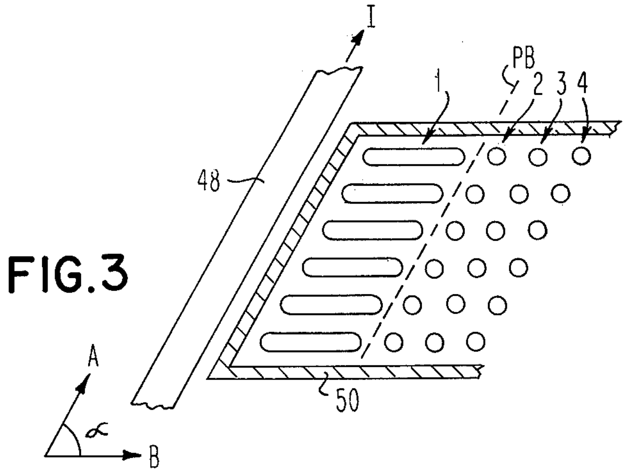
FIG. 3 illustrates a second embodiment of a stripe domain length adjusting conductor useful in the arrangement of FIG. 1.

FIG. 2 illustrates the working principle of a serpentine current carrying buffer conductor 46 formed on one side of the lattice array. The buffer conductor 46 spatially modulates a bias field along a column direction A. The domains of the end column number 1 thus form stripe domains and position themselves at locations of minimum field value. On increasing the drive current I, the bias field decreases at these locations and the stripe domains S of the end column 1 elongate along the direction B of the arrow, which is the direction of the desired bubble domain D translation. The pressure of the elongation of the stripe domain of the end column number 1 on the adjacent bubble domains in their rows causes a translation pressure in the direction B. At the same time, buffer conductors at the other end of the same rows contract the end stripe domain relieving some of the translation pressure caused by an elongation of the stripe domains in column 1. A practical limitation of the buffer conductors 46 shown in FIG. 2 arises from the fact that the serpentine conductor pattern has to be equal to the spacing between bubble domain centers in the lattice, distance C. That is, the width of the serpentine buffer conductor 46 must be roughly one-fourth of the lattice spacing. The practical limit for the conductor width at present is approximately 2$\mu$m, since at present any lesser conductor width becomes difficult to fabricate by present date photolithographic processes.

It has been further discovered that it is not necessary to use a drive field amplitude modulated along the direction of the arrow A. A regular stripe domain pattern occurs in a lattice because of magnetostatic interactions between the stripe domains themselves. Stripe domain lengths can thus be controlled with a straight conductor placed parallel along the direction of the arrow A. This stripe domain buffer conductor 48 is shown in FIG. 3. The associated variation in bias field along the direction B determines the equilibrium position of the phase boundary between the stripe domains and the bubble domains in the lattice. This is shown in FIG. 4.

Figure 4:
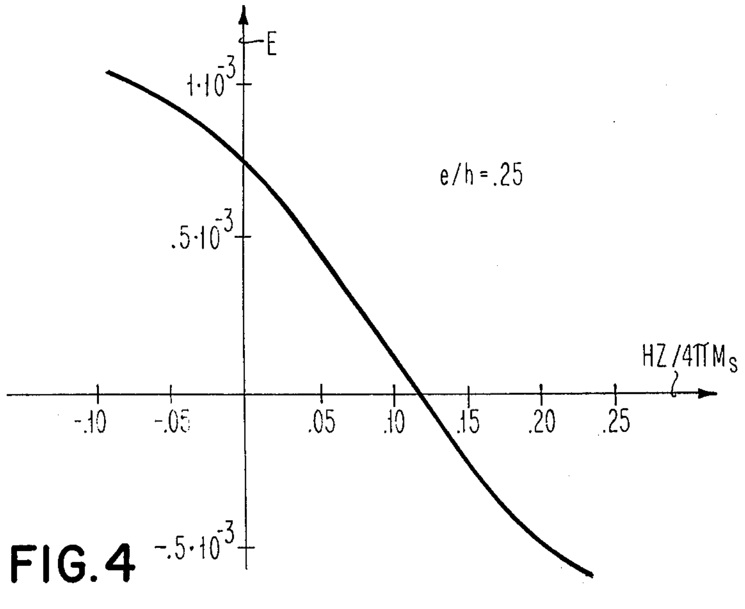
FIG. 4 shows a curve illustrating the energy density difference of bubble domains and stripe domains as a function of the bias field.

Referring to FIG. 4, the two phases (bubble and stripe) of bubble arrays exhibit different energy dependencies on the bias field. FIG. 4 shows a plot of the energy density difference E between the close packed bubble domains and the stripe domain phase where the energy density difference E is equal to the energy of the bubble domain minus the energy of the stripe domain as a function of the bias field HZ for a material having a characteristic length to film thickness ratio of 0.25. For these material parameters, the energy density vanishes when the bias field HZ is equal to $0.12 \times 4\pi M_s$. In equilibrium therefore, the phase boundary between the stripe domains and the bubble domains will be located at a position having this particular bias field value. On changing the drive current I, the bias field HZ configuration along the direction A changes thereby causing a pressure on the phase boundary. This pressure tends to shift the phase boundary to a new equilibrium position. In the process each column of bubble domains is translated by an equivalent distance.

The straight translating conductor as shown in FIG. 3, buffer conductor 48, is applicable only if the phase boundary PB between the stripe and the bubble domains remains a straight line along a defined lattice axis. Without any imposed constraints, phase boundaries occur along any one of three axes defined by the nearest neighbor lattice positions. In FIG. 2 the defined orientation of the bubble domains and the phase boundary is accomplished through the serpentine buffer conductor 46. The defined orientation of the bubble domains in the lattice array shown in FIG. 3 is accomplished by an enclosure means, sputter etched guide rail 50, or any of the other enclosure means previously stated such as the guide rails 24 and the interaction prevention line 44 of FIG. 1. Guide rail 50 prevents the domains from escaping the lattice.

The phase boundary PB between the stripe and bubble domains is generally positioned equal to the angle assumed by a column of bubble domains for interaction equilibrium between bubble domains in a lattice. The angle alpha for the preferred embodiment is 60°. The buffer conductor 48 is positioned parallel to the required phase boundary because the bias field produced by the buffer conductor 48 is constant along its length.

The lattice arrangement 20 of FIG. 1 can utilize either translation or modulation means as shown in FIGS. 2 and 3. FIG. 1 shows the guide rails 24 and the interaction line 44 forming the enclosure means to enclose the bubble domains within each three rows of the lattice 21 and thus the straight buffer conductor 48 of FIG. 3 can be used for buffer conductors 40–43. The buffer conductors 40–43 are located at both ends of the lattice and are oriented parallel to the column direction, the direction of arrow A in FIGS. 2 and 3.

The operation of the lattice arrangement 20 of FIG. 1 is as follows. First, the buffer conductors 40–43 are activated by the electrical current from the propagation current control unit 30. Simultaneously, the propagation current control unit 30 directs an electrical current through propagation conductors 28 and 29. For instance if the information stored in the bubble domains of column number 4 of the lattice 21 was required for sensing, buffer conductors 40 and 43 would elongate the stripe domains at the left end of the first three rows and the right end of the last three rows of bubble domains. Buffer conductors 41 and 42 would be controlled such that the stripe domains at the left end of the last three rows and the right end of the first three rows are contracted. The propagation conductor 28 would be sequenced such that bubble domains in the top three rows are propagated to the right, and propagation conductors 29 would be sequenced such that bubble domains in the bottom three rows are propagated to the left. The control circuit 36 would need to know the translation distance required. When the bubble domains of column 4 are in the first column accessing device 26A, the bubble domains are propagated in a transverse direction out of the lattice 21 and sensed by the sensing means R. The information in the bubble domain is directed to the utilization device 32. The pulse source 27 is activated by the control circuitry 36 to generate bubble domains having a required information in the write means W. These newly generated bubble domains are propagated into the lattice 21 by the column accessing device 26A to maintain the integrity of the lattice 21.

Any column of bubble domains can be moved into one of the three accessing column channels by increasing the length of the stripe domains on one side of the lattice, while decreasing or contracting the stripe domain length on the other side by the same amount. If adjacent accessing channels are separated by N number of bubble domain distances C, then a maximum change in the length of the stripe domain of (N-1)C is required. The top section of the lattice 21 of FIG. 1 shows the domain configuration associated with maximum bubble domain translation to the left while the bottom section of the lattice show the domain configuration associated with maximum lattice translation to the right. Since bubble domains in a lattice are not entirely rigid, it is desirable to control the exact amount of bubble propagation by using the associated propagation means, the propagation conductors 28 and 29.

As evidenced by the bubble pump shown in the aforementioned application Ser. No. 429,601, the stripe domains S of the buffer sections in FIG. 1 can be used to propagate the bubble domains without the presence of the propagation conductors 28 and 29. Elongating the stripe domains on the left end of the top three rows of the lattice 21 by adjusting the current in buffer conductor 40, while contracting the corresponding stripe domains of these rows at the top right end of the lattice 21 will provide bubble domain propagation to the right to position a specific column of domains into a column accessing device 26. The interaction forces between bubble domains will provide the required force to move the entire row.

The entire propagation control and stripe domain length adjustment can be provided by the propagation means such as propagation conductors 28 and 29 of FIG. 1. The propagation means can provide the adjusting means for adjusting the length of the stripe domains S again because of the interaction forces between domains. With a zero bias field, propagating bubble domains away from one end of the lattice will cause an elongation of the stripe domain lengths at that end because of the lowering of the interactive forces in its row, and a contraction of the stripe domain lengths at the opposite end because of increased interactive forces. The buffer conductors 40–43 need not be present to maintain lattice integrity. The preferred embodiment, however, is as shown in FIG. 1 with separate propagation and adjustment means for speed of operation.

The principles of the invention have now been made clear in an illustrated embodiment. It will be immediately obvious to those skilled in the art that many modifications of structure, arrangements, proportion, the elements, materials and components may be used in the practice of the invention. For instance a straight buffer conductor is shown in FIG. 1. It is obvious that a serpentine conductor as shown in FIG. 2 could be used instead, with an enclosure means placed only along the length of the lattice. The serpentine conductor will provide an enclosure means and an adjusting means for the domains at the ends of the lattice. Also a 6 × 15 lattice is shown together with three column accessing devices. It should be evident that neither the size of the lattice nor the number of column accessing means nor the length of the stripe domains should be used to limit the present invention. Further, other translation or adjustment means other than the buffer conductors can be used to expand or contract stripe domains, it being evident that it is the field gradient produced by the buffer conductors that causes the elongation and contraction and therefore the translation disclosed in the preferred embodiment. The appended claims are therefore intended to cover and embrace any such modification, within the limits only of the true spirit and scope of the invention.

What I claim is:

1. A combination for maintaining the integrity of a bubble domain lattice having an enclosed plurality of bubble domains in rows and columns on a medium supporting bubble domains, said combination comprising:

a column of stripe domains established on each end of the lattice, one pair for each row of bubble domains in the lattice; and adjusting means for expanding and contracting, at opposite ends, the length of each pair of said stripe domains in accordance with the required propagation direction of its row of bubble domains.

2. A combination as described in claim 1 wherein said adjusting means comprises an essentially straight line current carrying conductor situated on each end of the lattice parallel to the column of bubble domains and producing a magnetic field gradient affecting the length of said stripe domains.

3. A combination as described in claim 1 wherein said adjusting means comprises a serpentine shaped current carrying conductor situated on each end of the lattice assisting in the enclosure of the domains in the lattice and producing a magnetic field gradient affecting the length of said stripe domains.

4. A combination as described in claim 1 wherein said adjusting means comprises propagation means for moving bubble domains along their rows, the domain interaction forces expanding and contracting the length of said stripe domains according to the propagation direction to maintain lattice integrity.

5. A combination as described in claim 1 further including propagation means for moving said bubble domains away from the expanding stripe domains towards the contracting stripe domains.

6. A combination as described in claim 1 wherein said adjusting means comprises a plurality of separately controllably adjusting means each expanding and contracting the length of at least one pair of stripe domains at each end of the lattice to propagate the bubble domains of its row.

7. In a magnetic domain arrangement including a bubble domain lattice having an enclosed plurality of bubble domains in rows and columns on a medium supporting bubble domains and at least one column accessing means including bubble domain generating means and sensing means, wherein the improvement for maintaining lattice integrity comprises:

a column of stripe domains established on each end of the lattice, one pair for each row of bubble domains in the lattice; and means for adjusting the length of said stripe domains transverse to the column accessing means to position specific columns of bubble domains of said lattice into said column accessing means, said adjusting means expanding and contracting said stripe domains, respectively, at opposite ends of the lattice in accordance with the required propagation direction of its row of bubble domains.

8. An arrangement as described in claim 7 wherein said adjusting means comprises a plurality of separately controllable adjusting means each expanding and contracting the length of at least one pair of stripe domains at each end of the lattice to propagate the bubble domains of its row.

9. An arrangement as described in claim 7 wherein said adjusting means comprises an essentially straight line current carrying conductor situated on each end of the lattice extending along the length of each end parallel to the column accessing means and producing a magnetic field gradient affecting the length of said stripe domains.

10. An arrangement as described in claim 7 wherein said adjusting means comprise a serpentine shaped current carrying conductor situated on each end of the lattice assisting in the enclosure of the domains in the lattice and producing a magnetic field gradient affecting the length of said stripe domains.

11. An arrangement as described in claim 7 wherein said adjusting means comprises propagation means for moving bubble domains into and out of said column accessing means, the domain interaction forces expanding and contracting the length of said stripe domains according to the propagation direction to maintain lattice integrity.

12. An arrangement as described in claim 7 further including propagation means for moving said bubble domains away from the expanding stripe domains towards the contracting stripe domains.

13. A combination for maintaining the integrity of a transverse access bubble domain lattice having a confined plurality of bubble domains in rows and columns on a medium supporting bubble domains, said lattice having at least one column accessing means including bubble domain generating means and sensing means and having propagating means actuable to move the columns of bubble domains in the lattice bidirectionally into and out of said column accessing means, said combination comprising:

a column of stripe domains established on each end of the lattice, one pair for each row of bubble domains in the lattice; and means for adjusting the length of said stripe domains transverse to the column accessing means, said adjusting means, in conjunction with said propagation means, expanding and contracting said stripe domains at each end of the lattice in accordance with the direction of the movement of the columns of bubble domains controlled by said propagating means.

14. A combination as described in claim 13 wherein said adjusting means comprises an essentially straight line current carrying conductor situated on each end of the lattice extending along the length of each end parallel to the column accessing means and producing a magnetic field gradient affecting the length of said stripe domains.

15. A combination as described in claim 13 wherein said adjusting means comprises a serpentine shaped current carrying conductor situated on each end of the lattice assisting in the enclosure of the bubble domains in the lattice and producing a magnetic field gradient affecting the length of said stripe domains.

16. An arrangement comprising:

a plurality of bubble domains on a medium supporting bubble domains;

means for enclosing said bubble domains into rows and columns to form a lattice;

column accessing means for inserting and removing bubble domains into and out of the column of bubble domains positioned in said column accessing means;

a column of stripe domains established on each end of the lattice, one pair of each row of bubble domains in the lattice;

means for adjusting the length of said stripe domains transverse to the column accessing means to position specific columns of bubble domains in said lattice array into said column accessing means;

control means for actuating said adjusting means to expand and contract said stripe domains, respectively, at each end of the lattice to position a column of bubble domains into said column accessing means, said control means further controlling said column accessing means to remove the positioned column of bubble domains and insert a column of bubble domains.

17. An arrangement as described in claim 16 wherein said adjusting means comprises an essentially straight line current carrying conductor situated on each end of the lattice extending along the length of each end parallel to the column accessing means and producing a magnetic field gradient when actuated by said control means.

18. An arrangement as described in claim 16 wherein said column accessing means includes means for nucleating bubble domains having a data information state for storage in the lattice.

19. An arrangement as described in claim 18 wherein said column accessing means further includes means for sensing said bubble domain to retrieve the data information stored therein.

20. An arrangement comprising:

a plurality of bubble domains on a medium supporting bubble domains;

means for enclosing said bubble domains into rows and columns to form a lattice;

column accessing means for inserting and removing bubble domains into and out of the column of bubble domains positioned in said column accessing means;

a column of stripe domains established on each end of the lattice, one pair for each row of bubble domains in the lattice;

means for adjusting the length of stripe domain transverse to the column accessing means;

means for propagating the columns of bubble domains bidirectionally into and out of said column accessing means; and control means for actuating said adjusting means in conjunction with said propagating means, to expand and contract said stripe domains, respectively, at each end of the lattice in accordance with the direction of propagation of the row of bubble domains by said propagating means and to position a column of bubble domains into said column accessing means, said control means further controlling said column accessing means to remove the positioned column of bubble domains and insert a column of bubble domains.

21. An arrangement as described in claim 20 wherein said adjusting means comprises an essentially straight line current carrying conductor situated on each end of the lattice extending along the length of each end parallel to the column accessing means and producing a magnetic field gradient affecting the length of said stripe domains.

22. An arrangement as described in claim 20 wherein said column accessing means includes means for nucleating bubble domains having a data information state for storage in the lattice.

23. An arrangement as described in claim 22 wherein said column accessing means further includes means for sensing said bubble domain to retrieve the data information stored therein.

* * * * *